United States Patent [19]

Chen et al.

[11] Patent Number: 4,573,199

[45] Date of Patent: Feb. 25, 1986

[54] KANJI/CHINESE FONT GENERATION BY SCALING

[75] Inventors: Shu-Chun Chen, Ossining; Samuel C. Tseng, Pleasantville, both of N.Y.

[73] Assignee: International Business Machines Corp., Armonk, N.Y.

[21] Appl. No.: 608,608

[22] Filed: May 9, 1984

[51] Int. Cl.[4] .................................................. G06K 9/42

[52] U.S. Cl. ........................................ 382/47; 340/731; 340/751; 178/30

[58] Field of Search .................... 382/47, 69; 358/287; 340/731, 751; 400/110; 178/30

[56] References Cited

U.S. PATENT DOCUMENTS

| | | | |
|---|---|---|---|
| 3,991,868 | 11/1976 | Robinson et al. | 178/30 |
| 4,242,678 | 12/1980 | Somerville | 340/731 |
| 4,286,329 | 8/1981 | Goertzel et al. | 340/751 |
| 4,394,693 | 7/1983 | Shirley | 358/287 |

*Primary Examiner*—Leo H. Boudreau
*Assistant Examiner*—Jacqueline Todd
*Attorney, Agent, or Firm*—C. Lamont Whitham; Roy R. Schlemmer, Jr.; Frank Chadurjian

[57] ABSTRACT

A method of data compression which allows an enlarged font of complex characters to be produced by scaling from data representing a stored font of complex characters is disclosed. The scaling procedure involves the insertion of horizontal and vertical lines into the stored font to effect vertical and horizontal expansion, respectively, of the stored font. These lines are inserted so as to preserve the basic shape of the characters according to the following procedure. First, the dot matrix of each character is partitioned into sections, each containing a very pronounced and recognizable portion of the character. Then a decision is made in which sections to insert lines so that enlargement is attained without distorting the basic overall shape of the character. Next, a decision is made where in the sections the lines are to be inserted. Finally, a decision is made as to what the inserted lines are to look like. The results of these decisions are stored with data representing the stored font as side information so that an enlarged version of the font can be generated on the fly without need of arithmetic processing. A refinement of this basic technique additionally stores a sparse matrix containing the error of the generated matrix as compared with the original one. This additional information permits the generation of the exact duplicate of the original font.

5 Claims, 22 Drawing Figures

FIG. 1 EXAMPLE OF MINCHO FONTS
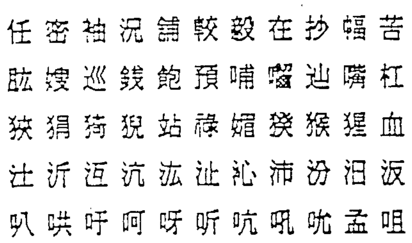
FIG. 2A
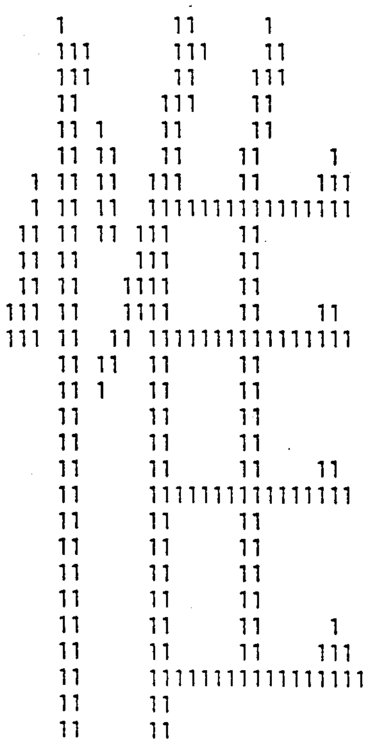
FIG. 2B
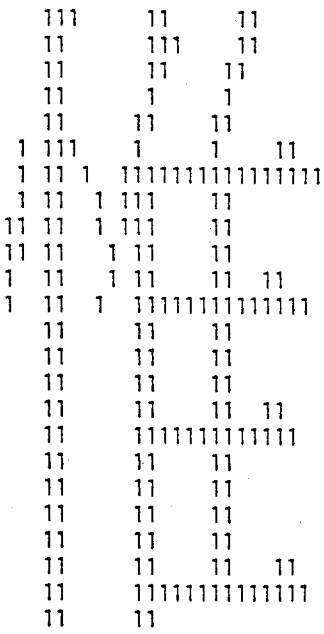

FIG. 3 DIFFERENT STROKES IN A CHINESE CHARACTER
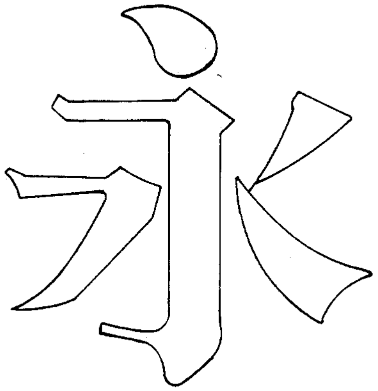
FIG. 5A
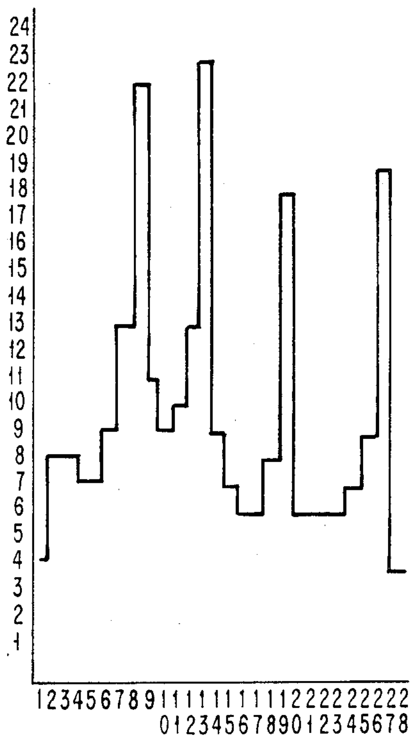
FIG. 5B
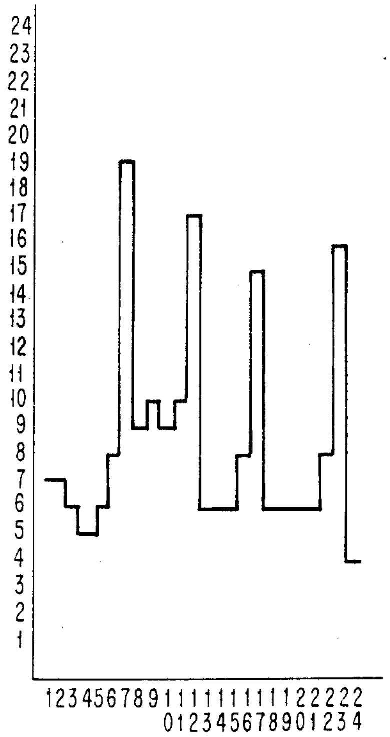

FIG. 4A SIGNIFICANT HORIZONTAL LINES (MARKED 'X')
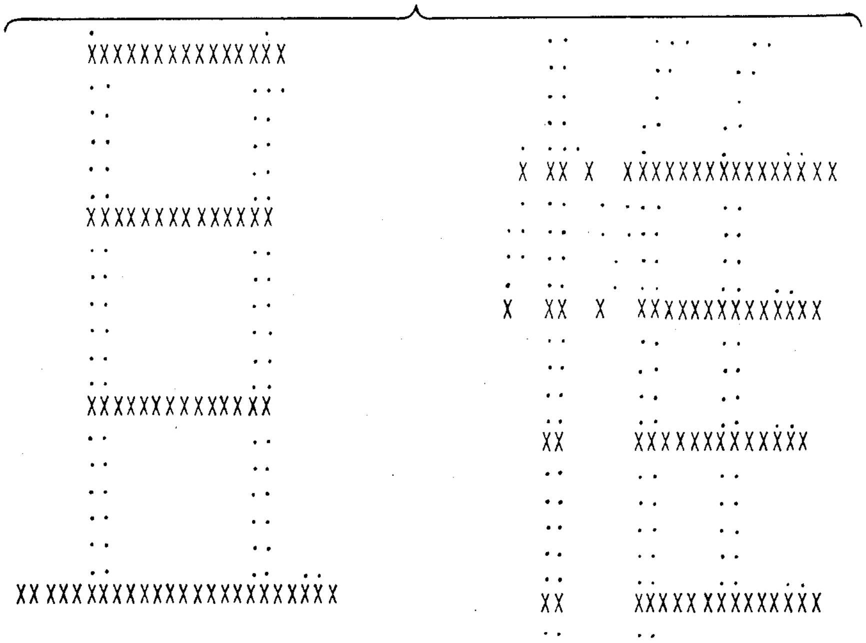
FIG. 4B SIGNIFICANT VERTICAL LINES (MARKED 'X')
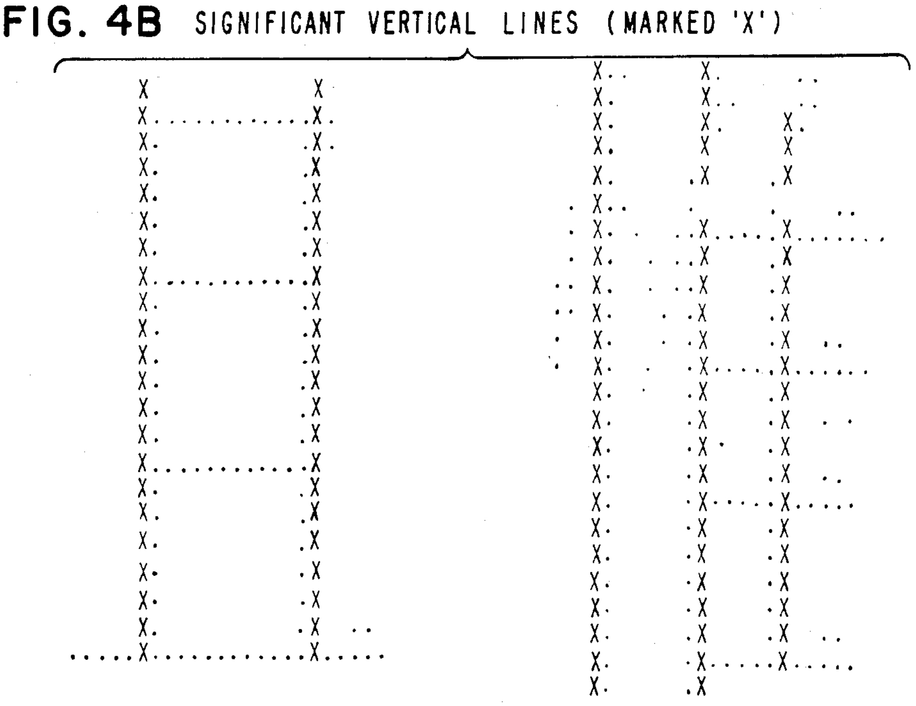

FLOWCHART FOR SCALING

FLOWCHART FOR INTERACTIVE FONT GENERATION TOOL

FIG. 8 A KANJI CHARACTER COMPOSED OF SUBPATTERNS
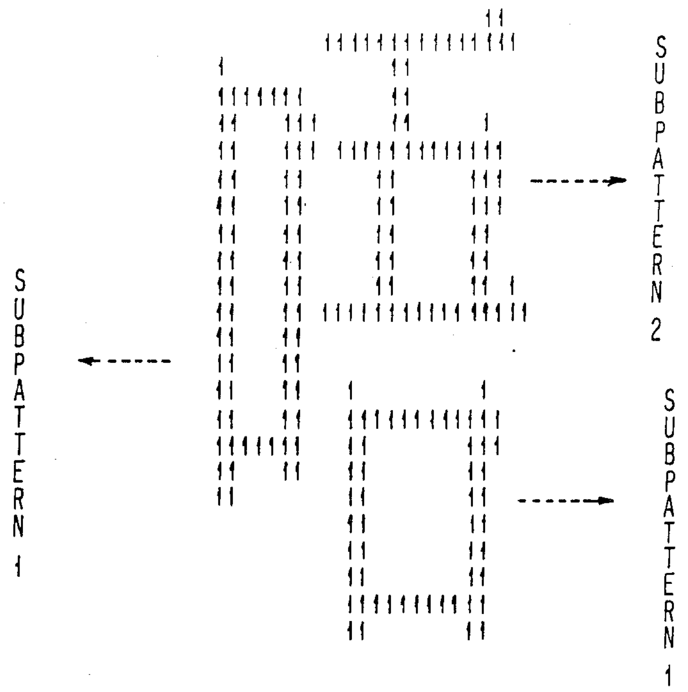

FIG. 9A THE ORIGINAL 28×28 FONT
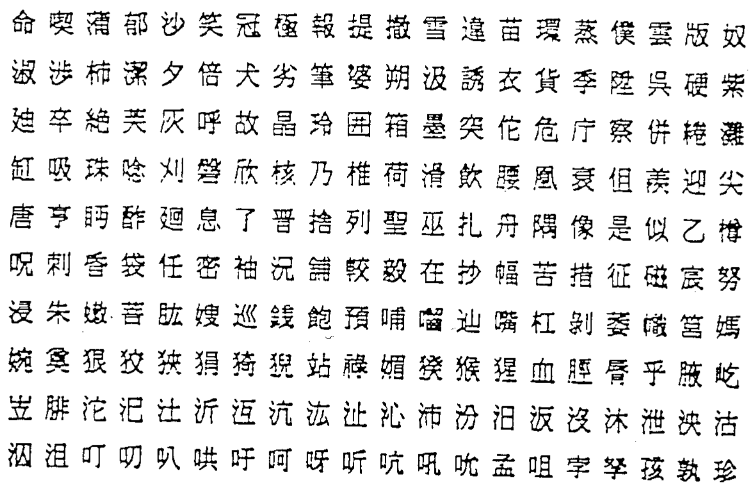
FIG. 9B THE ORIGINAL 24×24 FONT
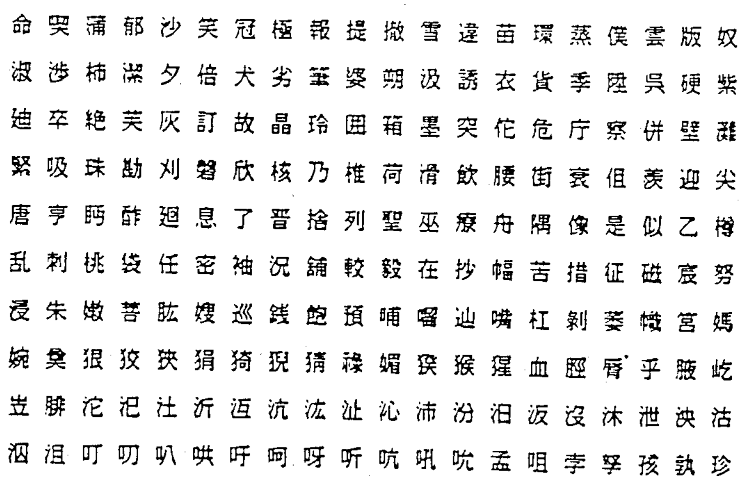

FIG. 9C GENERATED 28 × 28 FONT BY COPYING METHOD

命 契 蒲 部 沙 笑 冠 極 報 提 撤 雪 違 苗 環 蒸 僕 雲 版 奴
淑 渉 柿 渓 夕 倍 犬 劣 筆 婆 朔 汲 誘 衣 貨 季 陸 呉 硬 柴
迪 卒 絶 芙 灰 呼 故 晶 玲 囲 箱 墨 突 佗 危 庁 察 併 維 雑
缸 吸 珠 唸 刈 砦 欣 核 乃 椎 荷 滑 飲 腰 凰 衰 但 羨 迎 尖
唐 享 炳 酢 廻 息 了 晋 拾 列 聖 巫 扎 舟 隅 像 是 似 乙 樽
呪 刺 香 袋 任 窃 袖 況 舗 較 毅 在 抄 幅 苦 措 征 磁 宸 努
浸 朱 嫩 菩 肱 嫂 巡 錢 飽 預 哺 嚠 辿 嘴 杠 剥 委 幟 宮 媽
娩 奥 狠 狡 狭 狷 猗 猊 站 禄 媚 猥 猴 徨 血 脛 胥 乎 脈 屹
岦 腓 沱 汜 社 沂 洹 沆 汯 沚 沁 沛 汾 汨 汳 没 沐 泄 泱 沽
泅 沮 叮 叨 叭 哄 吁 呵 呀 听 吭 吼 吮 盂 咀 孛 孥 孩 孰 珍

FIG. 9D GENERATED 28 × 28 FONT BY INTERPOLATION METHOD

命 契 蒲 部 沙 笑 冠 極 報 提 撤 雪 違 苗 環 蒸 僕 雲 版 奴
淑 渉 柿 渓 夕 倍 犬 劣 筆 婆 朔 汲 誘 衣 貨 季 陸 呉 硬 柴
迪 卒 絶 芙 灰 呼 故 晶 玲 囲 箱 墨 突 佗 危 庁 察 併 維 雑
缸 吸 珠 唸 刈 砦 欣 核 乃 椎 荷 滑 飲 腰 凰 衰 但 羨 迎 尖
唐 享 炳 酢 廻 息 了 晋 拾 列 聖 巫 扎 舟 隅 像 是 似 乙 樽
呪 刺 香 袋 任 窃 袖 況 舗 較 毅 在 抄 幅 苦 措 征 磁 宸 努
浸 朱 嫩 菩 肱 嫂 巡 錢 飽 預 哺 嚠 辿 嘴 杠 剥 委 幟 宮 媽
娩 奥 狠 狡 狭 狷 猗 猊 站 禄 媚 猥 猴 徨 血 脛 胥 乎 脈 屹
岦 腓 沱 汜 社 沂 洹 沆 汯 沚 沁 沛 汾 汨 汳 没 沐 泄 泱 沽
泅 沮 叮 叨 叭 哄 吁 呵 呀 听 吭 吼 吮 盂 咀 孛 孥 孩 孰 珍

FIG. 9E GENERATED 28 28 FONT BY 'INTERACTIVE FONT GENERATION TOOL'
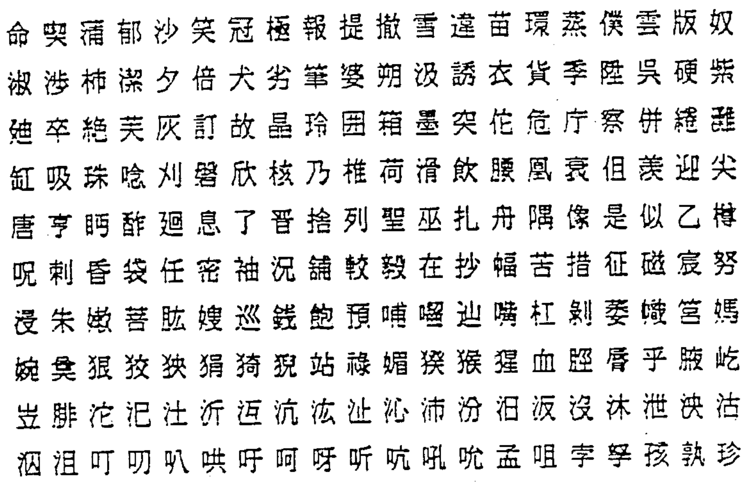
FIG. 9F EXACT REPRODUCTION
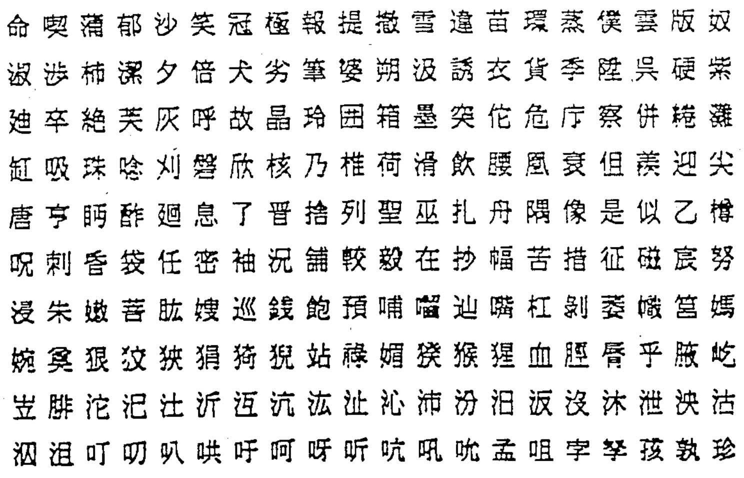

A CHARACTER IN THE ORIGINAL 28×28 FONT

THE CORRESPONDING CHARACTER IN THE GENERATED 28×28 FONT

KANJI/CHINESE FONT GENERATION BY SCALING

BACKGROUND OF THE INVENTION

The present invention generally relates to complex character generation, and more particularly to an enlargement procedure for scaling a stored font of complex characters in order to economize the memory requirements of computer output devices for printing or displaying dot matrix patterns of the complex characters. Although, the invention has particular application to the generation of Kanji or Chinese characters, the principles of the invention can be readily applied to the generation of other complex characters such as Hebrew characters, Arabic characters or the like. In fact, the principles of the invention can be applied to the generation of any complex characters including graphical characters.

For the computer output of Kanji/Chinese characters, the output device is often required to have the capability of printing or displaying more than one font of a character set. The most popular fonts for Kanji/Chinese characters are Mincho, an example being given in FIG. 1. A character set usually contains between 7,000 and 11,000 characters. In order to make all characters in a font legible, the dot matrix size should be at least 24×24. From the point of view of printer resolution, if a printer has a resolution of say, 200 pels/inch, and it is to print 10 point (10/72 inch) size characters, then the dot matrix size must be 28×28. Naturally, a larger dot matrix size is needed for a higher resolution printer to print a given size of characters. Commonly used dot matrix sizes are 24×24, 28×28 , 32×32, 36×36, and 40×40.

Assuming that an electrophotographic printer (a page printer) is to store 24×24 and 28×28 fonts, each font requires 720,000 bytes and 980,000 bytes of storage, respectively, taking a round number of 10,000 characters in each font. A total of 1.7 million bytes is by no means a small storage when it is the high speed RAM for high speed printers. There are a number of known character compaction and generation schemes for decreasing the number of memory locations to generate a given character set, each having certain advantages and disadvantages. U.S. Pat. No. 3,999,167 to Masamichi Ito et al discloses a technique for generating Kanji characters wherein every other dot element in an original character matrix is stored thereby achieving a reduction of one half in the required memory allocation for the character generator. U.S. Pat. No. 3,936,664 to Hiroshi Sato discloses a technique of generating Kanji characters wherein a given Kanji character is broken down into a plurality of vectors; however, the generated character is only an approximation of the original character. Even with the memory savings achieved by the techniques of Ito et al and Sato, the memory space required remains excessive. A much greater savings in memory is achieved by the method disclosed in U.S. Pat. No. 4,181,973 to Samuel C. Tseng and assigned to the assignee of this application. According to the prior Tseng method a dot matrix defining a given character is compacted into a sparse matrix with the original character being reconstructed for printing or display from the compacted character defined in the sparse matrix. Each character in the character set is compacted and stored in memory one time only with decompaction being performed each time a given character is to be generated. A set of symbols are defined to represent different patterns which occur frequently in the entire complex character set. Different combinations of the symbols define a given character. The information stored for each sparse matrix representing a given character is comprised of each symbol in the sparse matrix, its position, and its size parameter if the symbol represents a family of patterns which differ only in size. The Tseng method is further developed in U.S. Pat. No. 4,286,329 to Gerald Goertzel et al, also assigned to the assignee of this application. Whereas the character generator of Tseng operates in full serial fashion such that a given pattern must be decoded and then written before the decoding process of the following pattern is achieved, the complex character generator of Goertzel et al. operates in parallel mode such that as one pattern is being written, the following pattern is being decoded. Further, greater compaction is achieved by the Goertzel et al. techniques.

Another, but not mutually exclusive, approach to the problem of memory savings in the generation of complex characters is to store a single font of characters in one dot matrix size and generate other size fonts from the one stored size. An example of this is disclosed in U.S. Pat. No. 4,090,188 to Gojiro Suga. The approach taken by Suga is to compare the adjacent bits in rows or columns and insert a "1" between compared bits when both are "1's" or insert a "0" in all other cases in order to increase the size of the font. This technique can, however, produce serious distortions in the generated characters.

SUMMARY OF THE INVENTION

The approach taken by the present invention is one utilizing scaling. For example, only the 24×24 font together with some side information are stored. The 28×28 font is generated from the 24×24 font by scaling on the fly. The 24×24 font itself can be stored either as is or compressed as in the aforementioned patents to Tseng and Goertzel et al. depending on the time required to generate the result for printing. According to the present invention, horizontal and vertical lines are inserted into the stored font in order to effect vertical and horizontal expansion, respectively, of the stored font.

Where these lines are inserted so as to preserve the basic shape of the character is determined by the following procedure. First, the dot matrix is partitioned into sections, each containing a very pronounced and recognizable portion of the character. Then a decision is made as to which sections lines are to be inserted so that enlargement is attained without distorting the basic overall shape of the character. Next, a decision is made as to where in the sections the lines are to be inserted. Finally, a decision is made as to what the inserted lines are to look like. The results of these decisions are stored with the stored font as side information so that an enlarged version of the font can be generated on the fly without need of any arithmetic processing. A refinement of this basic technique additionally stores a sparse matrix containing the error of the generated matrix as compared with the original one. This additional information permits the generation of the exact duplicate of the original font.

BRIEF DESCRIPTION OF THE DRAWINGS

The invention will be better understood from the following detailed description with reference to the drawings, in which:

FIG. 1 is an example of Mincho fonts;

FIGS. 2A and 2B are a Chinese character in 28×28 and 24×24 dot matrix fonts, respectively;

FIG. 3 shows the different strokes in a Chinese character;

FIGS. 4A and 4B respectively show significant horizontal and vertical lines used to partition the dot matrix into sections;

FIGS. 5A and 5B show the vertical distribution functions of the 28×28 and 24×24 fonts in FIGS. 2A and 2B, respectively;

FIG. 8 is a Kanji character composed of subpatterns; and

FIGS. 9A, 9B, 9C, 9D, 9E, and 9F respectively show the original 28×28 font, the original 24×24 font, a generated 28×28 font by the copying method, a generated 28×28 font by the interpolation method, a generated 28×28 font by the interactive font generation tool, and the exact reproduction of the 28×28 font.

DETAILED DESCRIPTION OF THE INVENTION

Figure 6:
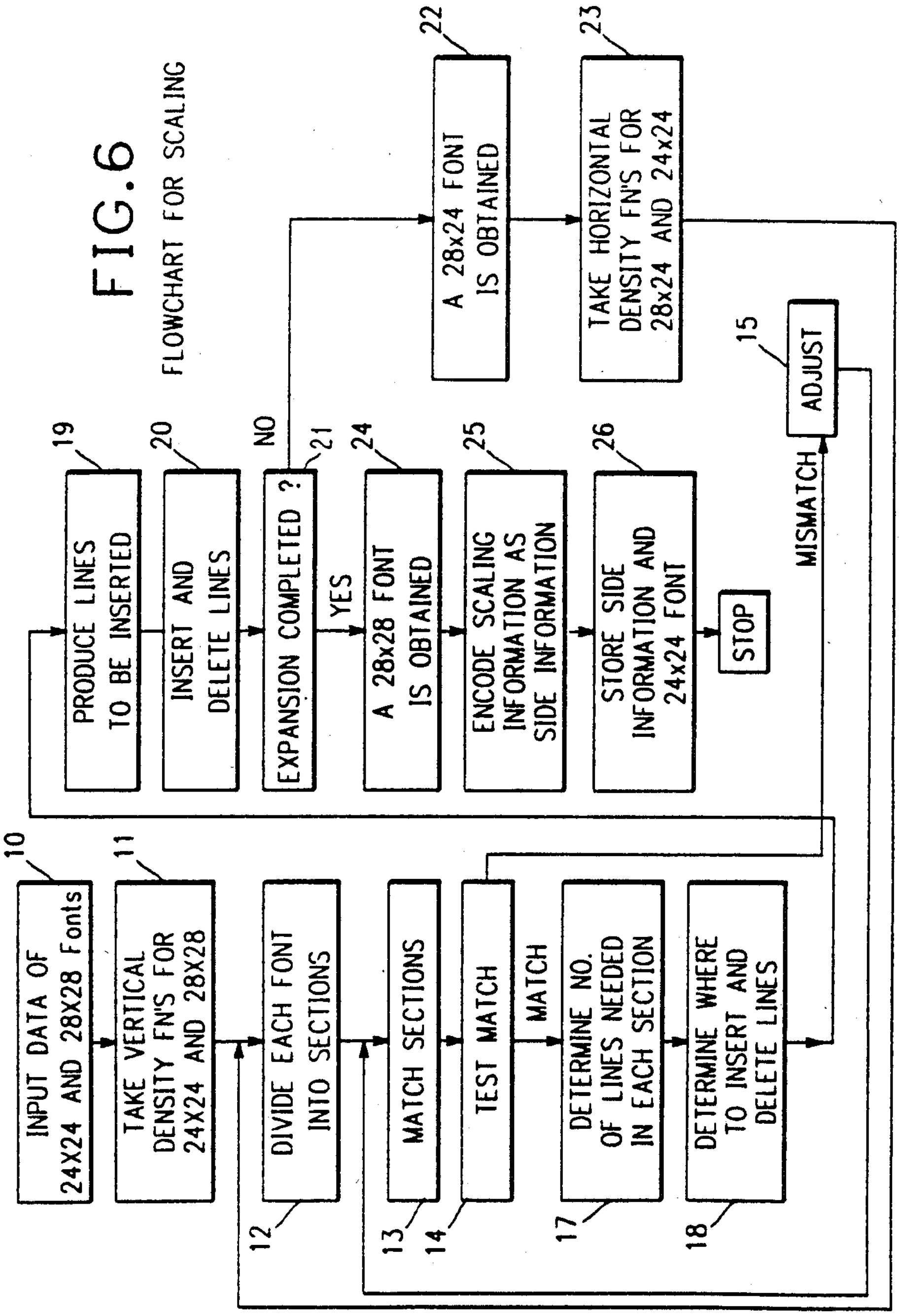
FIG. 6 is a flowchart for the scaling process according to the present invention.

In the specific example to be described, the 24×24 dot matrix of a character is to be stored with as little side information as possible from which a 28×28 matrix of that character can be produced very quickly. By very quickly, we mean that during the scaling process, no arithmetic or analysis is performed; the data is only rearranged. A few Boolean operations can be performed depending on the quality desired and the amount of time that can be spent on the scaling process. The side information describes where in the 24×24 matrix horizontal and vertical lines are to be inserted and perhaps where to delete lines. The novel feature of our procedure is that information describing what the inserted lines look like are not stored. We will first describe how we encode the side information regarding the insertion and deletion of horizontal lines. We label each line which does not precede an inserted line with a "1" and each line which is followed by an inserted one with a "01". If our procedure decides to insert lines after say, lines 4, 12, 17, and 21, then our side information describing these addresses is encoded as follows:

"1110111111111011110111101111"

We label those lines to be deleted with "001". Also, frequently we will want to insert boundary lines which are all "0's". We label these insertions with "0001". We label the vertical lines similarly. Storing all the address information for all horizontal and vertical lines to be either inserted or deleted requires at most ten bytes of memory. As indicated above, this is all the side information that our method requires for storage. Ten bytes of memory compares very favorably with the 98 bytes required to store the entire 28×28 font.

Consider the same character displayed in both 24×24 and 28×28 fonts as shown in FIGS. 2B and 2A, respectively. Our procedure scales up the 24×24 font to a 28×28 font which resembles the original 28×28 font as close as possible. Obviously, four horizontal and four vertical lines of pels (0's and 1's) must be added to the 24×24 font. The main part of the procedure involves a decision regarding the locations of the inserted lines. For the sake of simplicity, only the problem of inserting and deleting horizontal lines (vertical expansion) is considered in this description; however, those skilled in the art will recognize that the problem of horizontal expansion can be handled in a similar way. In order to preserve the basic shape of the character, it is convenient to first partition the dot-matrix into sections, each of which contains a very pronounced and recognizable portion of the character. Then a decision is made in which sections to insert or delete lines. In this way, the various sections are enlarged without distorting the basic overall shape of the character. Next, a decision is made exactly where in each section to either insert or delete lines. Finally, a decision is made what the inserted lines should lòok like. These four problems are discussed in order in the following description.

The character in FIG. 3 embodies the different strokes typically used in a Mincho font: dot, horizontal stroke, vertical stroke, hook, and slant stroke. Statistically, horizontal and vertical strokes occur more frequently than do other strokes, and typically some of these appear more pronounced to the human eye than do others. In FIGS. 4A and 4B, "significant" horizontal and vertical lines are distinguished by marking X's on them. This encourages us to imagine the lines with X's on them as wires on a grid. Ideally, we should be able to stretch the 24×24 font along vertical and horizontal directions until the grid wires line up with those of the 28×28 font. The significant vertical and horizontal strokes are used as boundary lines with which we partition the dot matrix into sections. We then have to match the sections of the 24×24 font with those of the 28×28 font.

To determine which horizontal strokes are significant, we first define the density functions F1 and F2 as follows:

F1 (i)=The number of occurrences of "1" in the i-th horizontal line of the 24×24 font, i=1, . . . ,24

F2(i) =The number of occurrences of "1" in the i-th horizontal line of the 28×28 font, i=1, . . . ,28

The density functions of the character in FIG. 3 are given in FIGS. 5A and 5B for the 28×28 and 24×24 fonts, respectively, shown in FIGS. 2A and 2B. The peaks of the density functions occur at what we call the significant strokes. In most character patterns, there exists a one-to-one correspondence between the peaks of F1 and F2. When this happens, we partition and then match corresponding sections. It may happen that a one-to-one correspondence does not exist, or that the fourth largest peak is not unique. Heuristic methods may be used to deal with those situations. Using such methods, it is sometimes necessary to use either fewer or more than four significant strokes to partition our matrices into matched sections.

Once we have a one-to-one correspondence between the sections of the 24×24 font and those of the 28×28 font, we check to determine that this correspondence is indeed a proper one. Section mismatch may occur, for example, when adjacent lines have very close density values. We first check to determine that each of the 28×28 font has at least as many lines as its corresponding section in the 24×24 font but no more than four more lines. If this is indeed the case, then we consider the match to be correct. If this is not the case, however, we do not yet conclude a section mismatch.

Next, we introduce the test function $$T(j) = \frac{A(j)/24}{B(j)/28}\; j = 1, \ldots, N-1$$

where

A(j)=boundary line number of the j-th section in the 24×24 font,

B(j)=boundary line number of the j-th section in the 28×28 font, and

N=the total number of sections in each matrix.

For a proper match, T(j) should be close to 1 for all j. If TH1≦T(j)≦TH2 for all j=1, . . . ,N−1, where TH1 and TH2 are some experimentally determined threshold values, then we consider our sections to be well matched. Otherwise, we have a section mismatch, and again heuristic methods may be used to deal with these situations. These methods divide the matrices further into more sections until a proper match is found.

Once we have matched sections, our next decision is in which sections to either insert or delete lines, and how many lines to insert in each section. The test function introduced in the previous discussion always guarantees that we need to delete at most one line from each section. We compute the differences D(j), j−1, . . . , N, of the number of lines in the j-th section of the 28×28 font minus the number of lines in the j-th section of the 24×24 font. From the above D(j)≧−1 and by construction, $$\sum_{j=1}^{N} D(j) = 4.$$

If D(j) is non-negative, then we have to insert D(j) lines into the j-th section. If D(j)=−1, then we have to delete a line from the j-th section. Tables showing matched sections of 24×24 and 28×28 fonts and the corresponding D vector are given below:

The sections for 28X28 font in FIG. 2A

| SECT. NO. | 1 | 2 | 3 | 4 | 5 |
|---|---|---|---|---|---|
| BEGIN LINE | 1 | 8 | 13 | 19 | 26 |
| END LINE | 7 | 12 | 18 | 25 | 28 |

The sections for 24X24 font in FIG. 2B

| SECT. NO. | 1 | 2 | 3 | 4 | 5 |
|---|---|---|---|---|---|
| BEGIN LINE | 1 | 7 | 12 | 17 | 23 |
| END LINE | 6 | 11 | 16 | 22 | 24 |

First expansion decision

| SECT. NO. | 1 | 2 | 3 | 4 | 5 |
|---|---|---|---|---|---|
| BEGIN LINE | 1 | 7 | 12 | 17 | 23 |
| END LINE | 6 | 11 | 16 | 22 | 24 |
| D(j) | 1 | ∅ | 1 | 1 | 1 |

In considering where to insert lines into a section which we have already decided to expand, we have tried two approaches. The first is to look for two consecutive lines whose Hamming distance is very short (i.e. their patterns are very similar) and to insert a line between them. The disadvantage of this approach is that it may overemphasize very pronounced strokes. The second approach is to look for lines with minimal density values and to insert a line right below them. The drawback of the second approach is that it may over enlarge sparse parts of the dot matrix. The choice of approach to use for each particular character is obviously a matter of taste.

As far as deletions are concerned, we look for two adjacent lines with minimal Hamming distance and delete the one with the smaller density value. Deletions occur very infrequently.

Once we have decided where in a particular section to insert lines, we have to determine what those lines should look like. We offer two methods. The first is to simply copy the line immediately preceeding the inserted one. This has the advantage of speed since we avoid any computation in forming the inserted line. But this method has a tendency to produce rough looking strokes in some characters; it especially affects slant strokes by producing undesirable zig-zags. Alternatively, we may produce the line to be inserted by interpolating its two immediate neighbors. The arrangements of "0's" and "1's" in a dot matrix of Mincho font are not random, but highly correlated. By observing the basic strokes which form these characters, we have obtained the following Boolean interpolation equations to create an inserted line x(i) from the knowledge of its adjacent lines a(i) and b(i):

x(1)=a(1)*b(1)

$$x(i)=((a(i-1)*a(i)*b(i+1))+(a(i+1)*a(i)*(b(i-1))+(a(i)*b(i))$$

where * denotes "and" and +denotes "or".

If we have to insert a line after the last line of a section, then we may either duplicate the last line or instead insert an interpolated line between the next to the last line and the last one. While the method of interpolation does smooth out the strokes, it may also destroy some desirable zig-zags. Again, the choice of which method to use is a mater of taste.

The method thus far described scales a 24×24 font up to a "produced" 28×28 font which closely resembles an "original" 28×28 font of the same character. For those who insist on an exact duplicate of the original font, the following refinement can be added to the basic procedure. Let A denote the dot matrix of the original font, let B denote the dot matrix of the produced font, and define the 28×28 dot-matrix as

E=A  B where  denotes the "exclusive or" operation performed on corresponding entries of the matrices A and B. E is then the matrix which measures the error of the produced matrix as compared with the original one. Since our method produces a good approximation to the original font, the matrix E is very sparse. This, E can be stored very efficiently in compressed form along with the side information and the 24×24 dot matrix. Exact duplication of the orignal 28×28 font can now be achieved using the equation A=B ** E.

Summarizing the principle features of the procedure according to the invention, reference is now made to FIG. 6 of the drawings which shows a flowchart of the scaling operation. In operation block 10, the data of the 24×24 and 28×28 fonts is inputed to the computer. The computer in operation block 11 takes the vertical density functions for both the 24×24 and 28×28 fonts. Based on these density functions, each font is divided into sections in operation block 12, and the divided sections are matched in operation block 13. Then in decision block 14, the match is tested. If there is a match, the procedure goes next to operation block 17; otherwise, the sections are adjusted in operation block 15 and the procedure returns to block 13. In operation block 17, the number of lines needed are determined for each section, and then in operation block 18 the places where the lines are to be inserted or deleted is determined. In operation block 19 the lines to be inserted are produced, and in block 20, lines are inserted and deleted as required. Next in decision block 21, a decision is made as to whether expansion is completed. In our discussion so far only vertical expansion has occurred; therefore, we proceed to operation block 22 wherein a 28×24 font is obtained. Next, in block 23 the horizontal density functions or both the 28×28 and 24×24 fonts is taken, and the process returns to block 12 to obtain horizontal expansion. Then an exit is made from decision block 21 to operation block 24 in which the 28×28 font is obtained. At this point, the data for scaling the 24×24 font to the 28×28 font has been obtained. Therefore, in block 25 this scaling information is encoded as the side information, and in block 26, it is stored with the 24×24 font.

Figure 7:
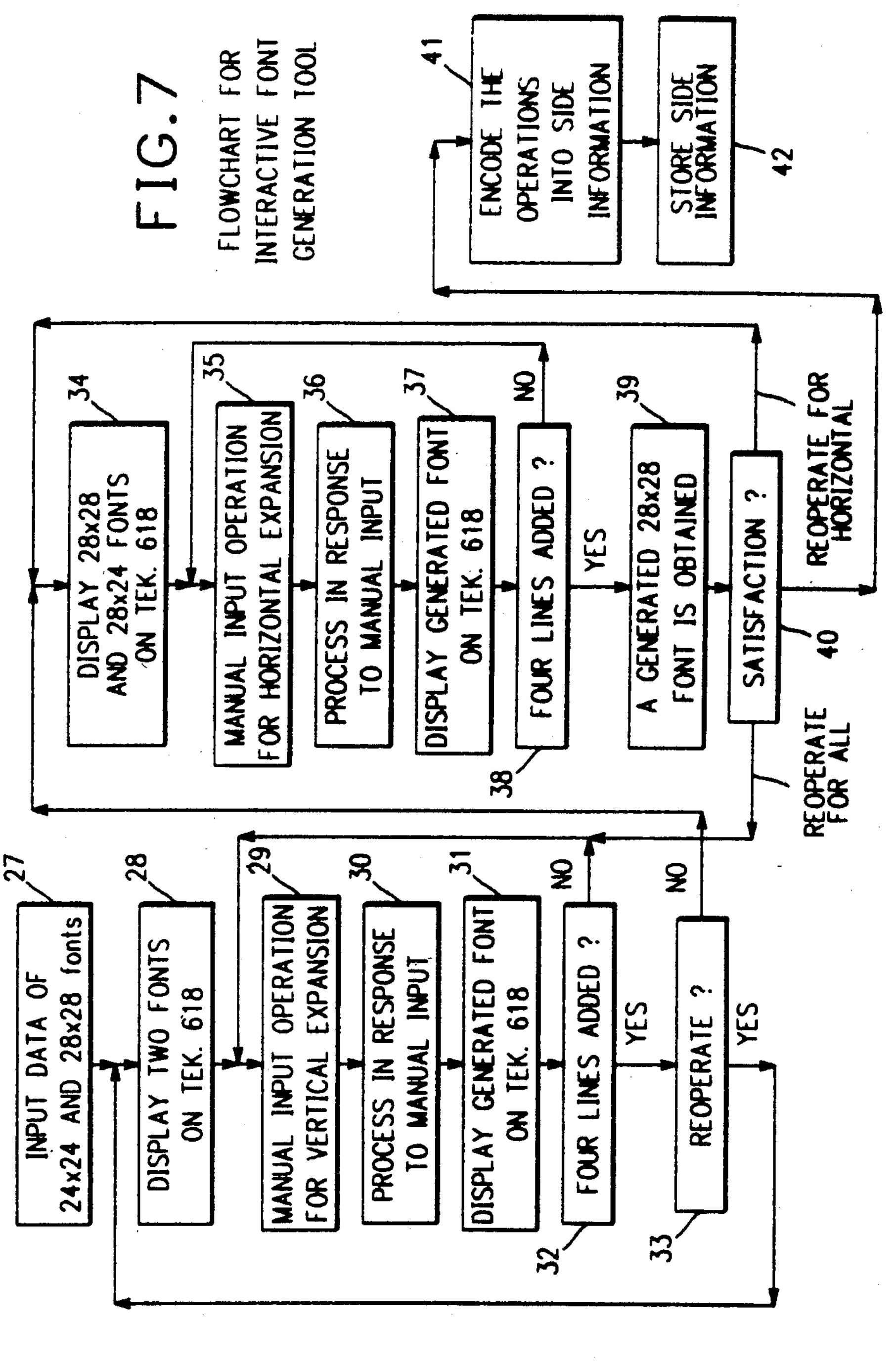
FIG. 7 is a flowchart for an interactive font generation tool which may be used to test various combinations and deletions on a graphic facility.
Figure 10A:
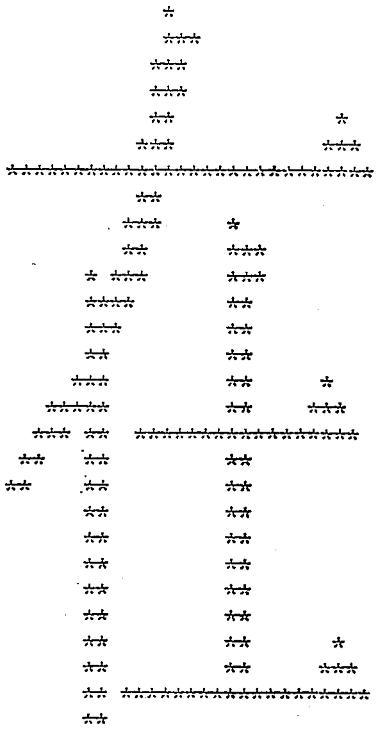
FIGS. 10A and 10B respectively show a character in the original 28×28 font and the corresponding character in the generated 28×28 font.
Figure 10B:
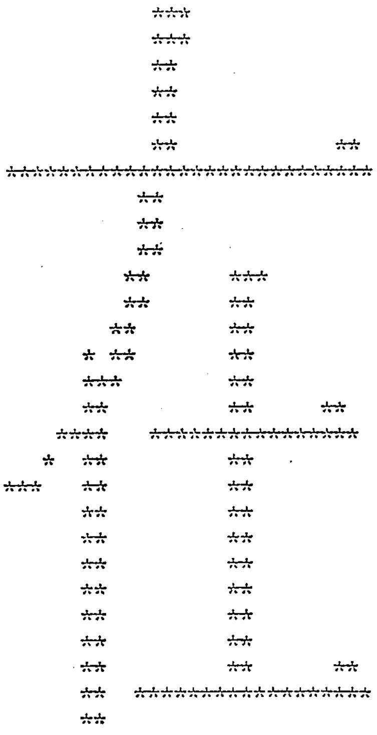
Figure 11:
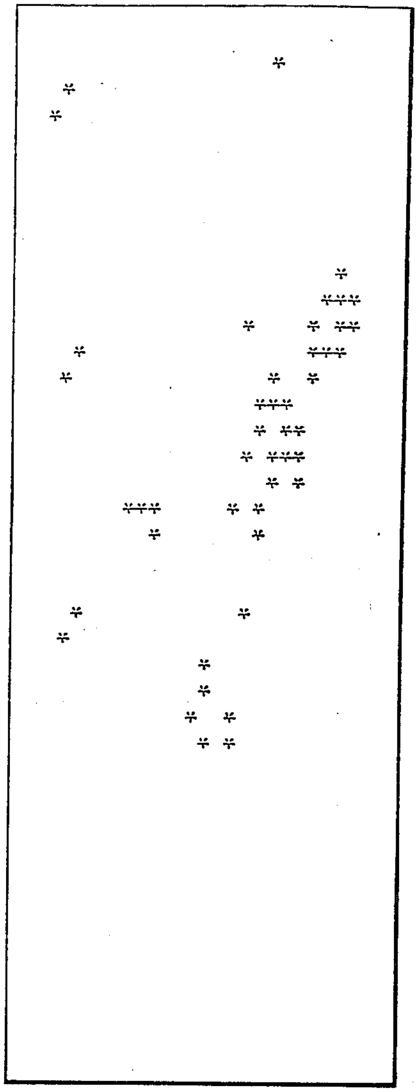
FIG. 11 shows the error matrix E for the character shown in FIG. 10B.
Figure 12A:
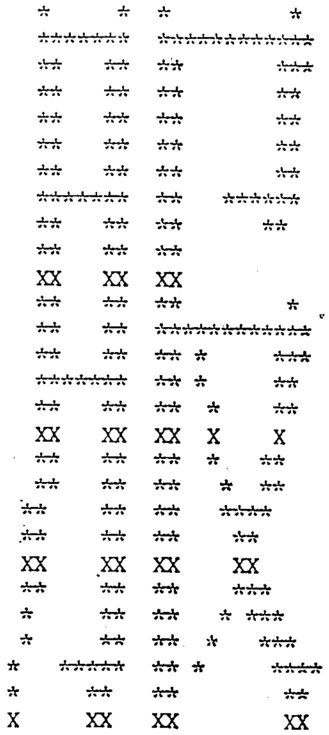
FIGS. 12A and 12B respectively show vertical expansion by interpolation and copy methods.
Figure 12B:
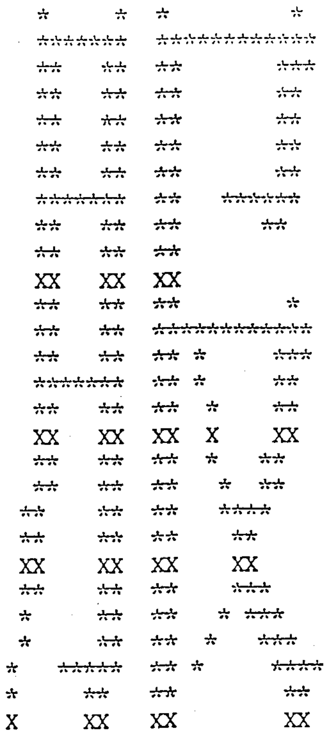

The algorithm which we have described (without using the exact duplication refinement) provides a fairly good enlargement for most Mincho characters. For those not satisfied with the results, we have produced an Interactive Font Generating Tool (IFGT). This is a software package which allows the user to use a graphic facility to actually test out various combinations of insertions and deletions and then decide which combination s/he likes best. Once the user makes a decision, s/he can encode the information using the methods described. The IFGT is illustrated in the flowchart of FIG. 7. To begin, the data of the 24×24 and 28×28 fonts is inputed to the graphic facility as indicated by operation block 27, and then the two fonts are displayed in block 28. The user then provides a manual input for vertical expansion in block 29. The manual input is processed in block 30, and the generated font is displayed in block 31. In decision block 32, if four lines have not been added to effect the vertical expansion, the interactive process returns to block 29 for futher manual input. Otherwise, the user is prompted in decision block 33 as to whether s/he desires to reoperate the procedure. If the user is satisfied and does not wish to reoperate the procedure, the 28×28 and the vertically expanded 28×24 fonts are displayed in block 34. On the other hand, if the operator decides to reoperate the procedure, the original 24×24 and 28×28 fonts are redisplayed in block 28. Returning to the display in block 34, the user next provides a manual input to the graphic facility to effect horizontal expansion as indicated by block 35. This manual input is processed in block 36, and the resulting generated font is displayed in block 37. If four lines have not been added, then decision block 38 returns the operation to block 35 for further manual input by the operator; otherwise, the process goes to block 39 in which the generated 28×28 font is obtained. Again, the operator will be prompted to indicate satisfaction of the generated font as indicated by decision block 40. This time there are three choices. If totally unsatisfied, the operator can opt to return to block 28 to begin anew. If the operator remains satisfied with the previously obtained vertical expansion, s/he can simply return to block 34 where the 28×28 and the previously generated 28×24 fonts are redisplayed. The third choice is, of course, that the operator is satisfied with the generated font in which case the procedure goes to block 41 where the operations are encoded into side information and then to block 42 where the side information is stored with the 24×24 font in memory.

It will be observed that the IFGT performs exactly the same procedure as that of our scaling algorithm. The difference is the substitution of an empirical approach for a purely analytical one. The IFGT also provides facilities for block expansion of those characters which are composed of distinct subpatterns. The example in FIG. 8 shows a Chinese character which is composed of distinct subpatterns. The idea behind block expansion is that each subpattern is treated separately, and this often yields better results. Even though we could have incorporated block expansion into our basic algorithm, as subpatterns are quite pronounced in Mincho characters, we have opted in our preferred embodiment of the invention not to do so because this would have enormously increased the complexity of the algorithm. Instead, we have only introduced the block expansion facility in our IFGT. The drawback of block expansion is the added requirement of memory to store the boundaries of all the blocks.

The described data-compression scheme stores information to generate computer printout of Chinese/Kanji characters of various fonts. Several alternatives have been described, the costlier ones yield more desirable outputs. FIGS. 9A to 9F show the results of the various methods.

Although the invention has been described in terms of one specific application, that of scaling a 24×24 font to a 28×28 font, the principles of the invention are equally applicable to the scaling between other and different fonts including non-square dot matrices. Moreover, it will be understood by those skilled in the art that the scaling of Chinese/Kanji characters is but a subset of the problem of scaling graphic characters of any arbitrary type.

We claim:

1. A data compression machine method for storing a complex character font from which an enlarged font can be generated by scaling with the insertion of horizontal and vertical lines into the stored font, comprising the steps of storing a representation of the dot matrix of each character in a first font of complex characters, partitioning each stored dot matrix into sections, each section containing a very pronounced and recognizable portion of the complex character represented by that matrix, for each section of a partitioned dot matrix, deciding in which sections to insert horizontal and vertical lines so that enlargement is attained without distorting the basic overall shape of the character, then deciding where in the partitioned sections the lines are to be inserted and what the inserted lines are to look like, and storing the information as to where the lines are to be inserted and what the inserted lines are to look like as side information with the originally stored font of characters, whereby an enlarged font of characters which closely resembles the stored font of characters can be produced on the fly from the data representing the stored font of characters and the side information.

2. The data compression machine method recited in claim 1 wherein the step of partitioning is performed by the steps of taking the vertical and horizontal density functions for both the stored font and the enlarged font, dividing each font into sections based on the vertical and horizontal density functions, and matching the sections.

3. The data compression machine method as recited in claim 1 further comprising the steps of producing an enlarged font of characters from the stored font of characters and the side information, performing a pointwise exclusive or operation on the produced enlarged font of characters and an original font of characters of the same size as the produced font to generate a sparse matrix of the error of the produced matrix as compared with the original font, and storing the sparse matrix with the side information whereby an exact duplicate of the original font can be produced on the fly from the data representing the stored font of characters, the side information and the sparse matrix.

4. A machine method of scaling an enlarged font of complex characters from a smaller font of complex characters comprising the steps of taking the vertical density functions for the enlarged font and the smaller font of complex characters, dividing each font into vertical sections based on the vertical density functions, matching the corresponding sections of each font, determining the number of vertical lines needed for each section of the smaller font to increase it to the size of the enlarged font, determining where the vertical lines are to be inserted in the sections so as to maintain the basic overall shape of the character, producing the vertical lines that are to be inserted, taking the horizontal density functions for the enlarged font and the smaller font of complex characters, dividing each font into horizontal sections based on the horizontal density functions, matching the corresponding sections of each font, determining the number of horizontal lines needed for each section of the smaller font to increase it to the size of the enlarged font, determining where the horizontal lines are to be inserted in the sections so as to maintain the basic overall shape of the character, producing the horizontal lines that are to be inserted, encoding the vertical and horizontal lines and their locations as side information, and storing the side information with data representing the smaller font of complex characters from which the enlarged font can be produced on the fly.

5. An interactive font generation tool for facilitating the scaling of an enlarged font of complex characters from a smaller font of complex characters comprising the steps of displaying both the enlarged font and the smaller font of complex characters, interactively producing a vertical expansion of the displayed smaller font of complex characters by inserting horizontal lines into each character at locations which maintain the basic overall shape of the character as empirically determined by a visual comparison of the vertically expanded smaller font with the displayed enlarged font until the character has the same vertical size as the enlarged font, interactively producing a horizontal expansion of the displayed smaller font of complex characters by inserting vertical lines into each character at locations which maintain the basic overall shape of the character as empirically determined by a visual comparison of the horizontally expanded smaller font with the displayed enlarged font until the character has the same horizontal size as the enlarged font, and encoding and storing the vertical and horizontal lines as side information with data representing the smaller font of characters from which the enlarged font of complex characters can be produced on the fly.

* * * * *